United States Patent [19]
Kurhi

[11] 3,846,022
[45] Nov. 5, 1974

[54] OPTICAL PRINTER
[76] Inventor: Jaakko Kurhi, 3908 High St., Oakland, Calif. 94619
[22] Filed: Mar. 5, 1973
[21] Appl. No.: 337,889

Related U.S. Application Data
[63] Continuation-in-part of Ser. No. 285,372, Aug. 31, 1972, abandoned.

[52] U.S. Cl. ............................................. 355/53
[51] Int. Cl. ....................................... G03b 27/42
[58] Field of Search ......... 355/53, 54; 352/170, 188

[56] References Cited
UNITED STATES PATENTS
1,859,022   5/1932   Burkhardt............................ 355/54

*Primary Examiner*—John M. Horan
*Attorney, Agent, or Firm*—James R. Cypher

[57] ABSTRACT

An optical printer consisting briefly of a frame, a camera carriage, a bellows unit, a printer head module and animation motor. The printer module includes a pair of spaced film sprockets connected to a stepping motor, a pair of film tensioning pins, a pair of film registration pins, pressure plate and aperture plate.

11 Claims, 18 Drawing Figures

FIG_11

FIG_17

FIG_18

OPTICAL PRINTER

BACKGROUND OF THE INVENTION

This is a continuation-in-part of my copending application Ser. No. 285,372 filed Aug. 31, 1972 now abandoned.

High speed film printing used by professional film producers is exceedingly costly and beyond the means of the individual movie makers who wishes to make film from previously developed 8 mm or 16 mm film. High speed optical printers are complicated and expensive in construction. Intermittent movement of the film past the aperture plate is obtained by an eccentric cam operating a transfer claw or Geneva drive, including cam operated registration pins.

All of the optical printers, which may be classified as low cost printers, are constructed and modified from film projectors, which have a claw type intermittent film transfer with continuously rotating film sprockets. The fact that part of the film is moving continuously and part intermittently, requires that large loops be formed in the film so there is sufficient slack at all times, allowing the claw to transfer film intermittently without breaking the film. Such printers do not have registration pins.

U.S. Pat. No. 2,407,795 granted in 1946 illustrates a device for maintaining a film loop.

Earlier examples of continuous powered intermittent film advancing shuttles are shown in U.S. Pat. Nos. issued to O'Grady 2,207,103 and Bettini 1,298,282.

SUMMARY OF THE PRESENT INVENTION

The gist of the present invention is the use of an optical printer which can project pictures so that a standard motor driven camera mounted on the printer frame can take a picture of the developed picture. The printer has a unique projector module having intermittently driven sprockets, film tensioning pins and registration pins.

Another object of the present invention is to eliminate all of the mechanical apparatus used to transform rotary motion to planar motion thereby reducing the number of parts and the maintenance problems.

A further object is to provide an optical printer which is reliable, easy to operate, has extremely accurate picture centering means and is relatively inexpensive so that it can be purchased by individual film makers and film teaching schools.

Still another object is to provide a printer which can transfer images of different sizes to unexposed film of different sizes.

A still further object is to provide a printer which eliminates loop forming mechanisms and expensive claw mechanisms.

Another object is to provide a printer which can be easily threaded.

A further object is to provide a device as described which can vary the light intensity of the projected image.

Still another object is to provide a printer which can be operated forward or backward with accurate frame registration.

A further object is to provide a printer in which the film registration mechanisms can be made inoperative during forward and reverse operation.

A BRIEF DESCRIPTION OF THE DRAWINGS

FIG. 8 is a perspective view of the optical printer constructed in accordance with the present invention. The developed reels, frame, camera mount, movie camera and bellows are shown in broken line.

BRIEF DESCRIPTION OF THE PREFERRED EMBODIMENTS OF THE INVENTION

Figure 1:
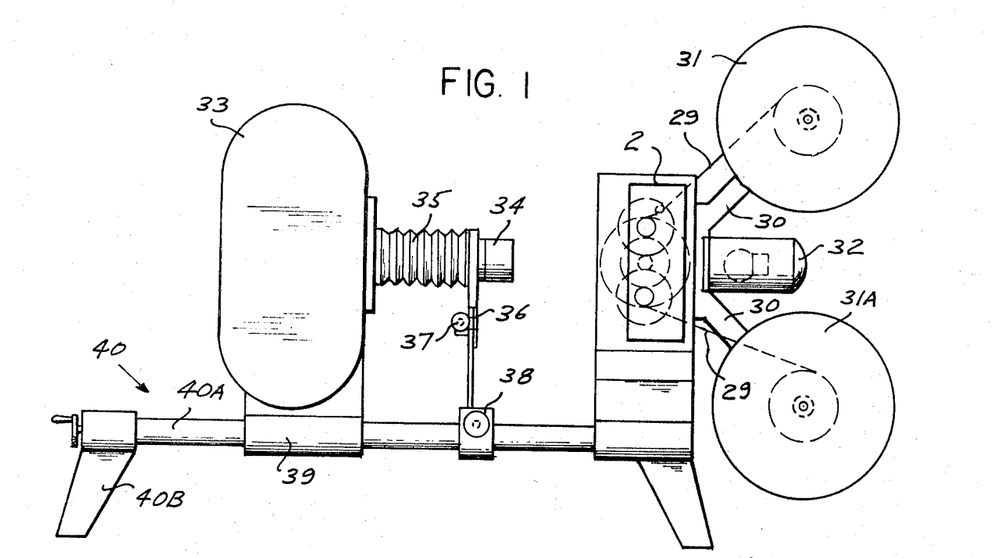
FIG. 1 is a side elevation view of the optical printer constructed in accordance with the present invention.
Figure 2:
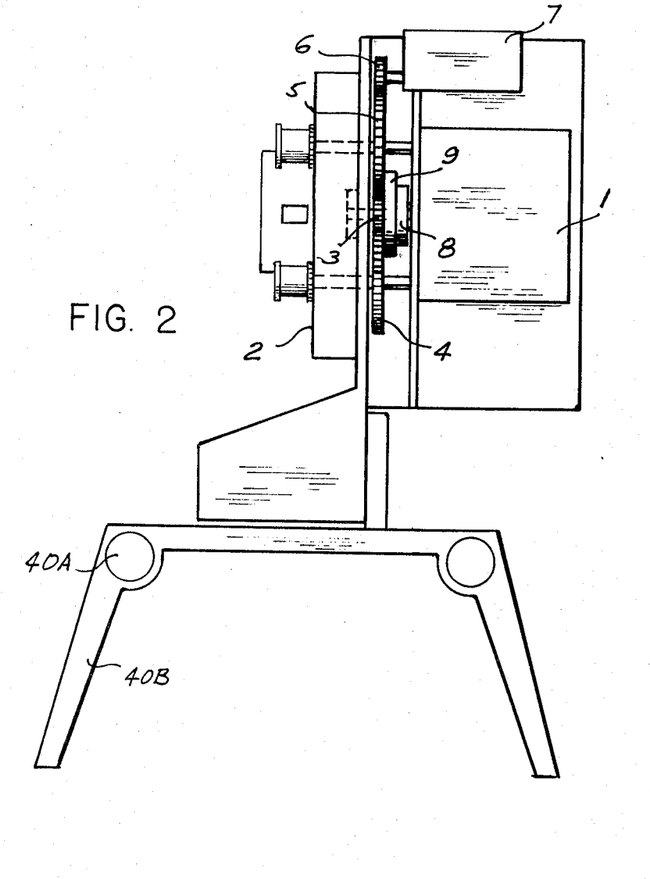
FIG. 2 is a front elevation view with parts removed for purposes of clarity.
Figure 3:
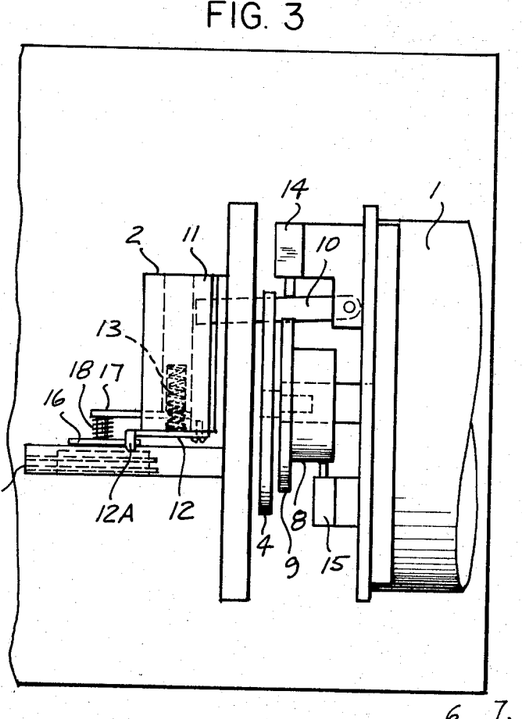
FIG. 3 is an enlarged plan view of a portion of the device.
Figure 4:
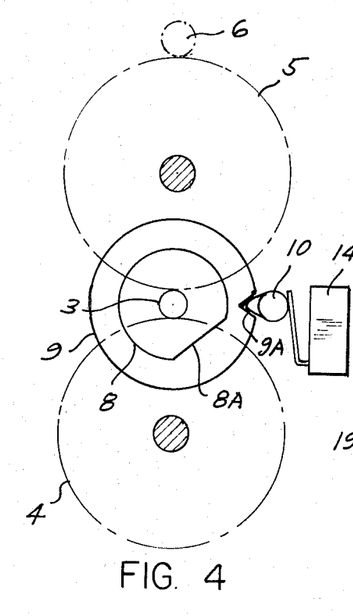
FIG. 4 is a diagrammatic view of the sprocket gears and cams.

Referring to FIGS. 1 and 2, the invention shows a movie camera 33 and a projector module 2 mounted on a frame 40. Frame 40 comprises a pair of slide rails 40A supported on four legs 40B. Camera 33 is provided with a slide mount 39 for adjustment on rails 40A. Adjustment means for bellows 35 terminating in lens 34 are provided in the three axes as follows: up and down adjustment is provided by a means 36, side to side adjustment is provided by a means 37 and finally front to rear adjustment is provided by a means 38.

Projector module 2 accepts an exposed film 29 fed from and taken up by a pair of spools 31 and 31A supported on a pair of brackets 30. A light unit 32 illuminates the image on the film frame that is to be photographed by camera 33.

Referring to all figures generally, a stepping motor 1, besides driving a pair of cams 8 and 9, drives a gear 3. Gear 3 drives a pair of gears 4 and 5, gear 4 in turn driving a feed sprocket 23A and gear 5 driving a take up sprocket 23B. A gear 6, meshing with gear 5, drives a frame counter 7. It may be noted at this point that each film frame which has stopped at an aperture plate 20 is counted by frame counter 7.

Cam 8 activates a microswitch 15 which gives an electric timing signal to camera 33 to photograph the image on aperture plate 20 at a time when film transfer movement has stopped on projector module 2. The switching action of cam 8 takes place on a straight portion 8A. Cam 9 has the function of making an arm 10 move in and out. When arm 10 is resting in recess 9A on cam 9, a microswitch 14 is in the off position. This stops motor 1. Arm 10 allows a slide 11 to move into position, forced by a spring 13. When motor 1 has been activated by a remote switch, cam 9 will force arm 10 from recess 9A. Arm 10 will then force slide 11 to the off position, and microswitch 14 to the on position which keeps the electric circuit closed until cam 9 has completed one revolution. Silde 11 holds a registration pin bracket 12 in position and gives in and out movement to registration pins 12A. Slide 11 also has the function of operating a film tension bracket 22. Thus registration pins 12A locate and hold a film frame in exact position on the aperture plate. A pressure plate 16, known in the art, keeps the film flat on aperture plate 20. A bracket 17 supports a spring 18 which in turn pushes against pressure plate 16. Filter slots 19 are provided for color correction filters and neutral density filters.

A pair of film tensioning pins 21 put tension on film 29 at the time the film is being transferred to the next frame. When movement stops, pins 21 relieves film 29 so that there is some slack on the portion of the film 29. This allows the registration pins 12A to locate the film frame accurately on aperture plate 20. Film tensioning pins 21 are secured to a pair of brackets 22. These brackets are rocker-supported.

Figure 5:
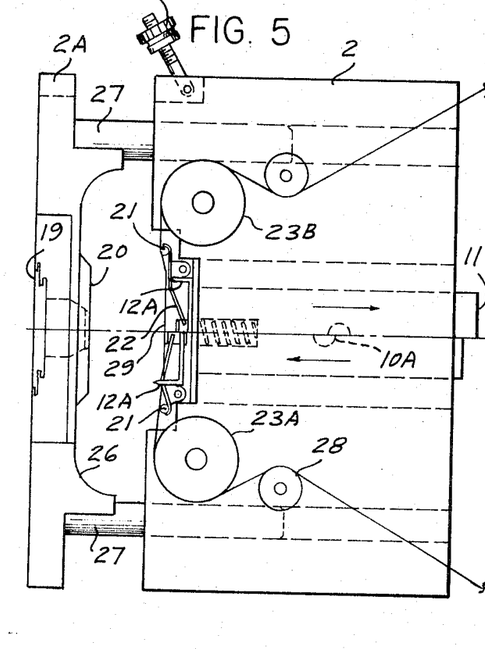
FIG. 5 is a diagrammatic view of the device in two operative positions.
Figures 6, 7:
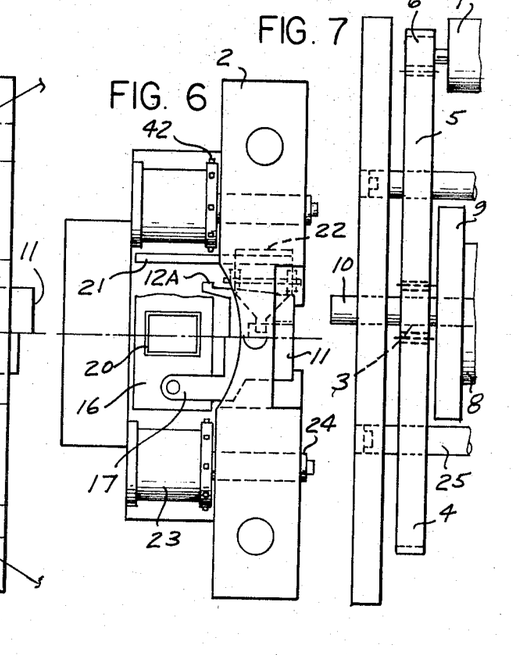
FIG. 6 is a front elevation of a portion of the device.
FIG. 7 is an enlarged portion of the device shown in FIG. 2.

FIG. 5 is a view split on the optical axis showing slide 11 split in the center so that the upper half illustrates the slide 11, loopformer pin 21 and registration pin 12A in the position when film 29 is being transferred. The lower half shows the position when movement has stopped and the film frame is being photographed by camera 33.

A pair of film guides 26 in the front member 2A of the projector module, when locked in by a locking screw 41, will engage with sprockets 23 and keep the film 29 on its path, preventing film 29 from slipping off sprocket pins 42.

A pair of slide bars 27 allow the front portion of the projector module to slide out so that film 29 can be easily threaded into place. A pair of idler rollers 28 support and guide film 29 from spool 31A through module 2 to take up spool 31.

Film can be 16 mm, Super 8 or 8 mm in size. Because each film size requires a different size of projector module, module 2 is removable and can be installed according to the size of the film 29 to be used.

PROJECTOR MODULE

Figure 12:
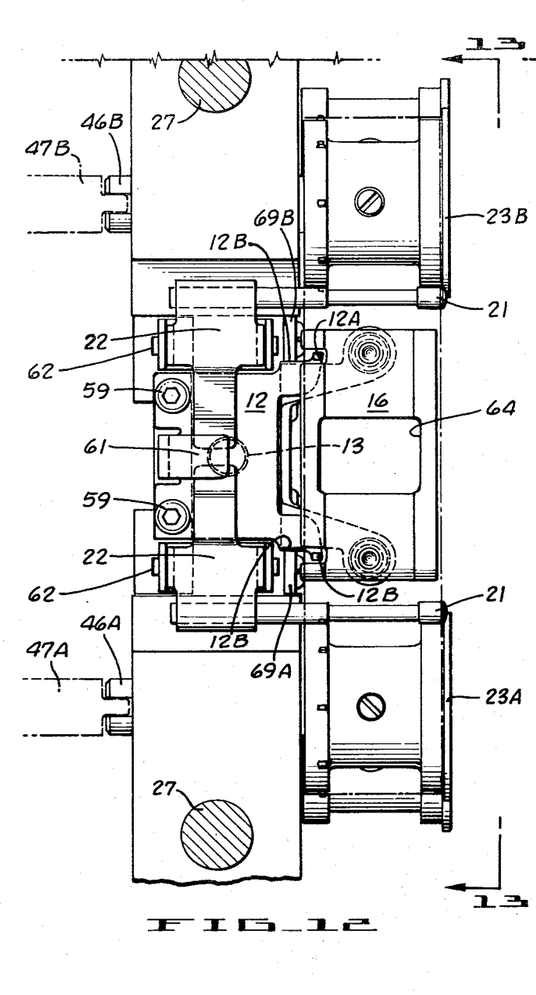
FIG. 12 is a partial end view of the printer head taken substantially along line 12—12 of FIG. 11.
Figure 13:
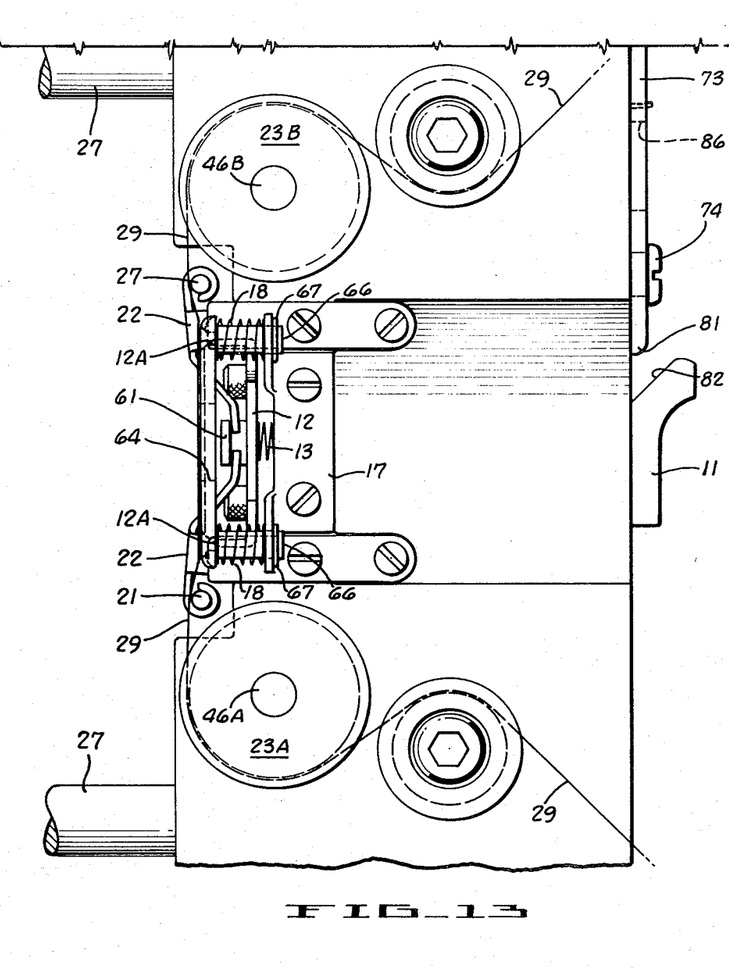
FIG. 13 is a side view of a portion of the printer head taken substantially along line 13—13 of FIG. 12 with parts removed for purposes of clarity.
Figure 16:
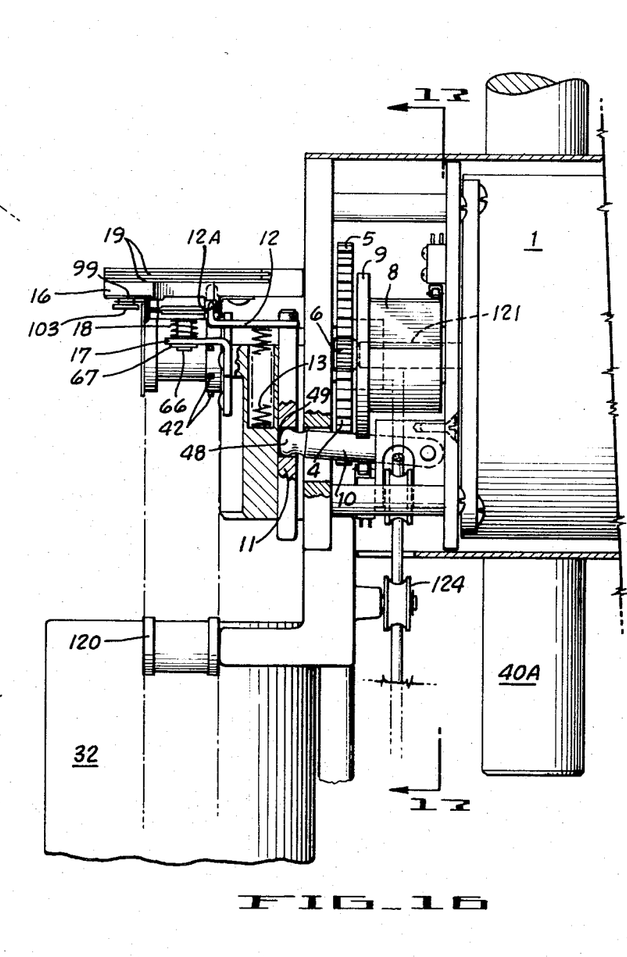
FIG. 16 is a top view of a portion of the device with portions in cross section and taken substantially along line 16—16 in FIG. 8.

The projector module is the heart of the optical printer. A feature of the projector module is the fact that it can be constructed to accommodate either 8 mm or 16 mm film. The module is interchangeable with the motor drive module and that is necessary to change from one format to the other is to loosen threaded module mounting screws 43 which are inserted through openings 44 in the projector module and into threaded openings in the motor module. It is only necessary to align the groove in sprocket shafts 46A and 46B with the boss in the motor module gear shafts 47A and 47B as shown in FIG. 12. When the shafts are aligned, the rounded end 48 of arm 10 will automatically be in alignment with opening 49 in slide 11 as shown in FIG. 16. To accommodate the different size films, it is, of course, necessary to vary the size of the sprocket wheels, idler wheels, aperture openings and film guides.

Figure 14:
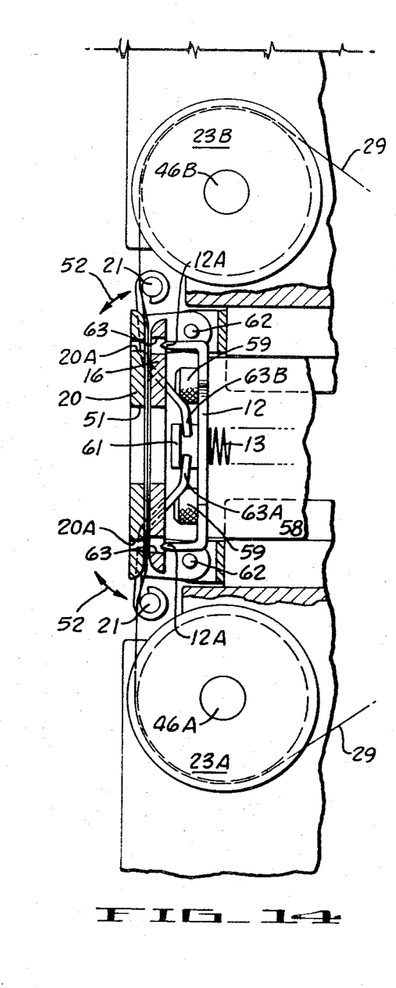
FIG. 14 is a side view of a portion of the printer showing the relative positions of some of the parts when the film is in the film advance position, with portions in cross section.
Figure 15:
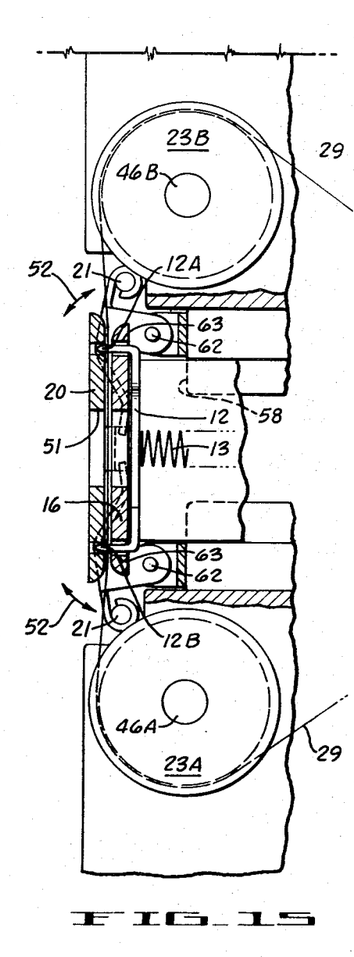
FIG. 15 is a side view of a portion of the printer showing the relative positions of some of the parts when the film is in the registered position, with portions in cross section.

In order that the sprocket wheels 23A and 23B will maintain a positive grip on the film, tension pins 21 are provided which are mounted for reciprocating motion in the direction of double arrows 52 in FIGS. 14 and 15. When the sprocket wheels are moving the film, the tension pins move to the left as shown in FIG. 14 against the film and maintain tension so that the sprocket pins will not slip on the perforations in the side of the film. When the film is stopped, the pins move to the right as shown in FIG. 15; there is a small amount of slack in the film, and the registration pins move into the film perforations and complete the registration operation.

FILM TENSIONING

Figure 11:
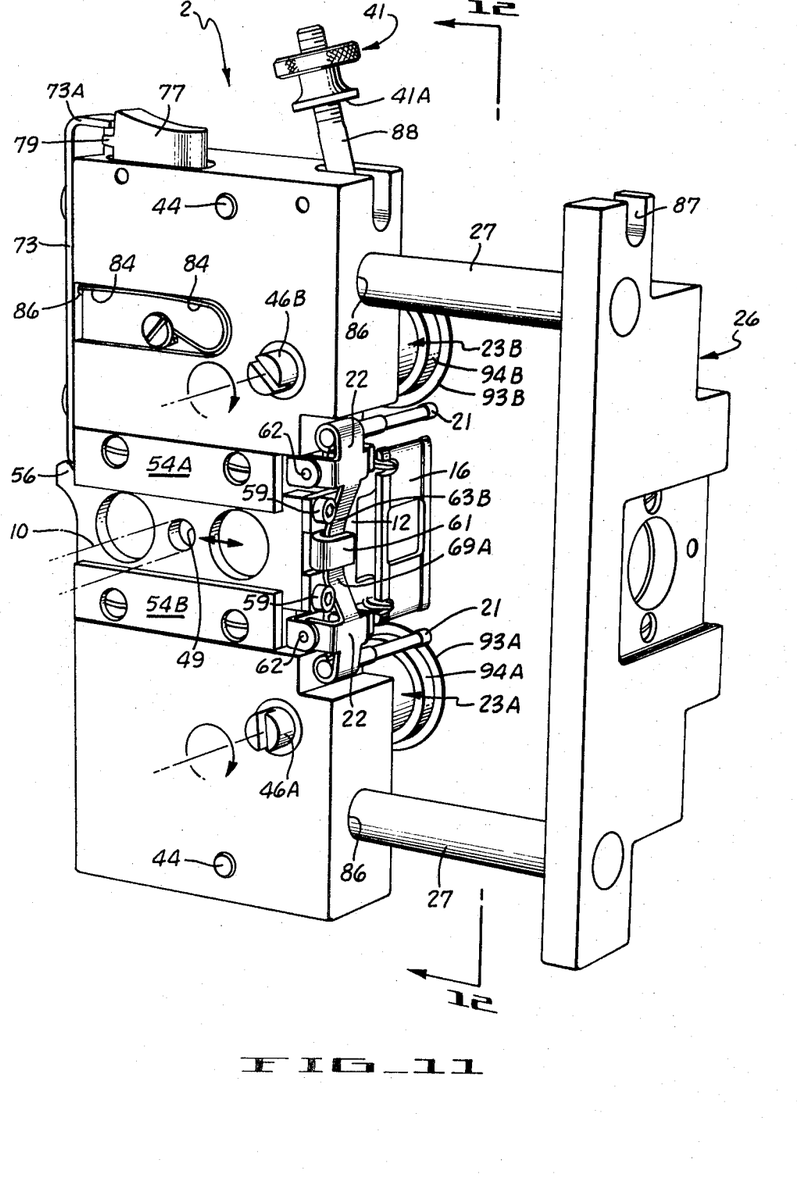
FIG. 11 is an enlarged perspective view of the printer head as seen from the animation motor side of the head.

The mechanism for tensioning the film during movement of the film is best shown in FIGS. 11, 12 and 16.

Figure 17:
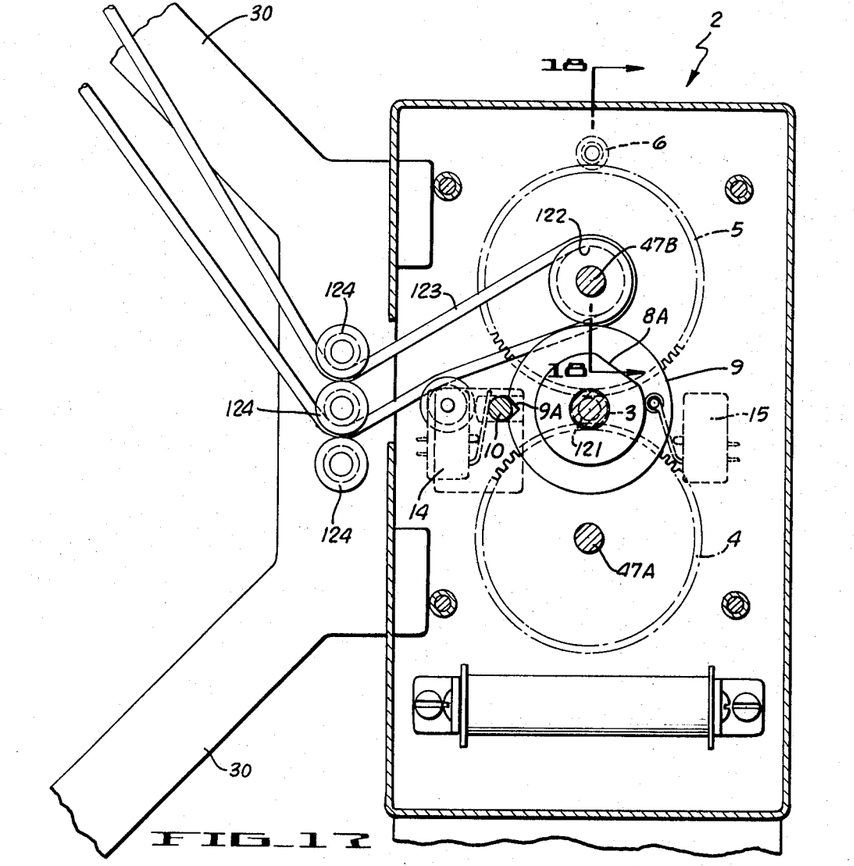
FIG. 17 is a cross section of a portion of the device, taken substantially along line 17—17 in FIG. 16.
Figure 18:
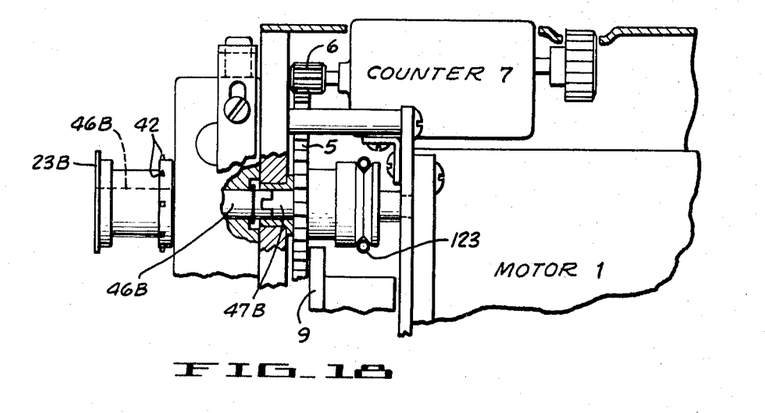
FIG. 18 is a cross section of a portion of the device taken substantially along line 18—18 of FIG. 17.

End 48 of arm 10 protrudes through an opening in the motor module and is activated by cam 9. When the arm is moved out of cam recess 9A and rides the outer edge of the cam face, arm 10 moves to the left as shown in FIG. 17. The end 48 of the arm is contained in opening 49 of slide 11. The slide, which moves in the direction of double arrow 53 is contained by blocks 54A and 54B and moved by arm 10.

FILM MOVEMENT

A feature of the present invention is the fact that the exposed film moves from the feed reel, through the printer and onto the take up reel intermittently. This is unlike previous printers where the sprockets are moving continuously and the movement of film past the aperture is driven intermittently by a transfer claw. The advantage of moving the film intermittently by the sprockets is to eliminate the Geneva drive and apparatus to insure that large loops are maintained to prevent breaking the film.

The step motor is controlled by the cams and microswitches so that the sprockets 23A and 23B are turned one-eighth of a turn and then stopped. The sprockets are arranged as shown in FIGS. 14 and 15 so that the film 29 is only slightly out of alignment with the face of the pressure plate 16. Note that there is no loop in the film between the sprockets 23A and 23B and the pressure plate 16. The sprocket pins on the sprockets 23A and 23B are carefully aligned so that when the motor stops, the openings in the side of the film will be in as close alignment as possible with the registration pins 12A. All sides of the pins are beveled so that when the film stops, the head of the pins will move easily through the openings in the film and the final alignment will be made by the registration pins. This final precise alignment is made possible by the fact that the film has some slack and the pins can move the film image into precise alignment with the aperture opening 51 in the aperture plate. The slack in the film is accomplished by the separation distance of the sprocket wheels and the placement of the sprocket pins 42. Each sprocket wheel is formed with eight pins.

The slide member is attached to the pins 21 in the following manner: Pin bracket 12 is attached to the slide block by screws 59. Pin bracket is formed with a tongue member 61 bent in a U-shaped form. Film tension brackets 22 are pivotally attached to the projector module by pivot pins 62 and are formed with arms 63A and 63B loosely held by tongue 61. Spring 13 constantly urges bracket 12 into engagement with arms 63A and 63B so that brackets 22 rock about pivots 62 upon movement of slide 11. Thus, tension pins 21 move against film 29 and place tension on the film when slide 11 moves to the left in FIG. 11 and to the right in FIG. 14. Tension is taken off the film when slide 11 moves to the right in FIG. 11 and to the left in FIG. 15.

FILM REGISTRATION

Registration of the pins in the projector module is accomplished in the following manner: Pin bracket 12 is directly connected to slide 11. When slide 11 moves to the left in FIG. 15, pins 12A move through openings 63 in the pressure plate. Pins 12A move through the perforations in the side of the film and into openings 20A in the aperture plate 20. Any deviation of the film from perfect registration is corrected by the pins 12A which are beveled and tend to move the film by wedge movement so that it is in perfect registration with the aperture opening 51. One pin aligns the film horizontally and the other pin aligns the film vertically. Vertical alignment of the pin bracket is maintained by guides 69A and 69B which bear against edges 12B of the pin bracket.

The advantage of obtaining of the registration pin movement by a cam operated by stepping motor is to eliminate more complicated mechanical construction of the registration pin movement.

FILM PRESSURE PLATE

Figure 10:
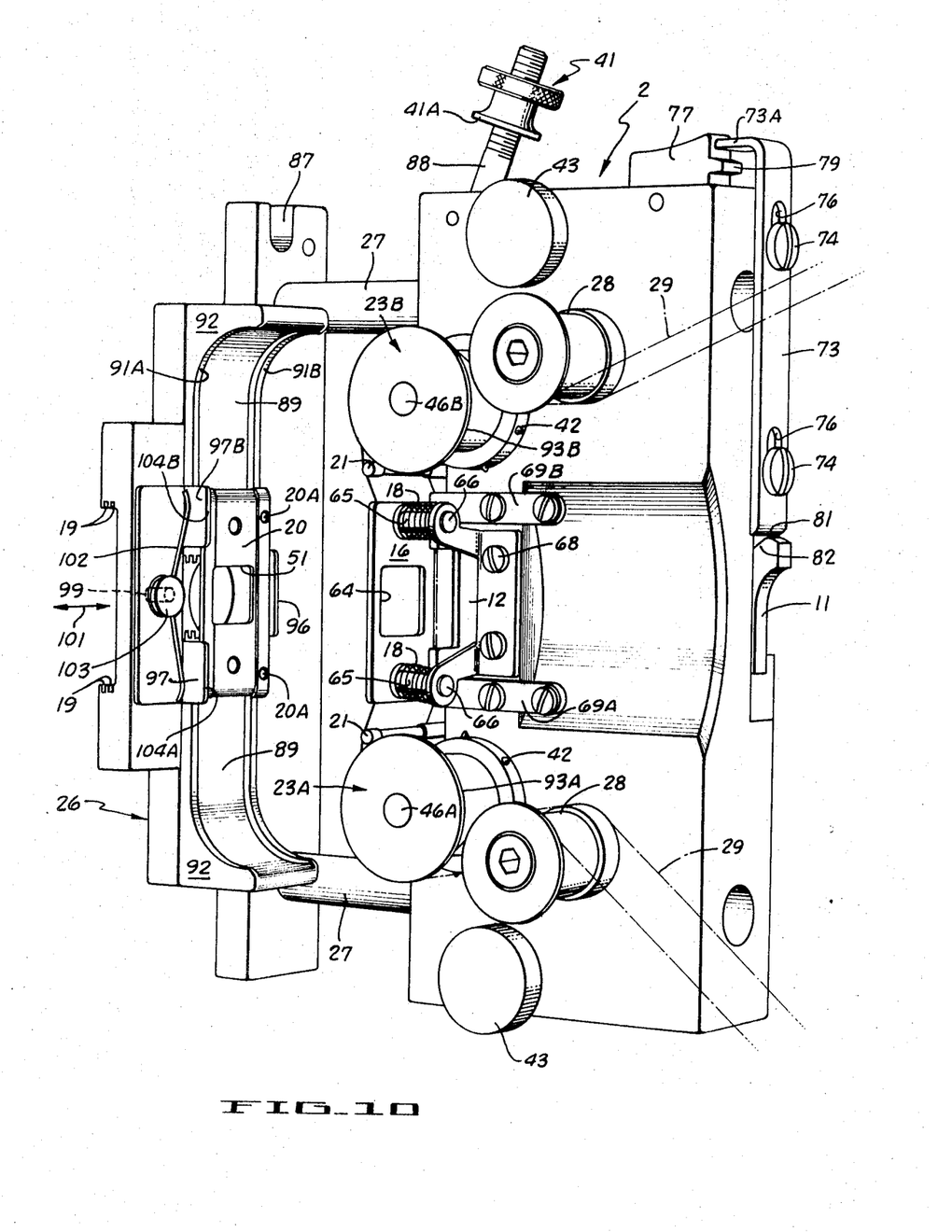
FIG. 10 is an enlarged perspective view of the printer head with the film guide opened and in position for loading the developed film.

Pressure plate 16 is formed with a light opening 64 and is mounted on pins 65 which are slidably received in openings 66 in bracket 17. Lock washers 67 prevent pins 65 from separating from bracket 17 and springs 18 bias the pressure plate to the left as shown in FIG. 10. The bracket 17 is attached to the projector module by fasteners 68.

FILM MOVEMENT WITHOUT PRINTING

Figure 9:
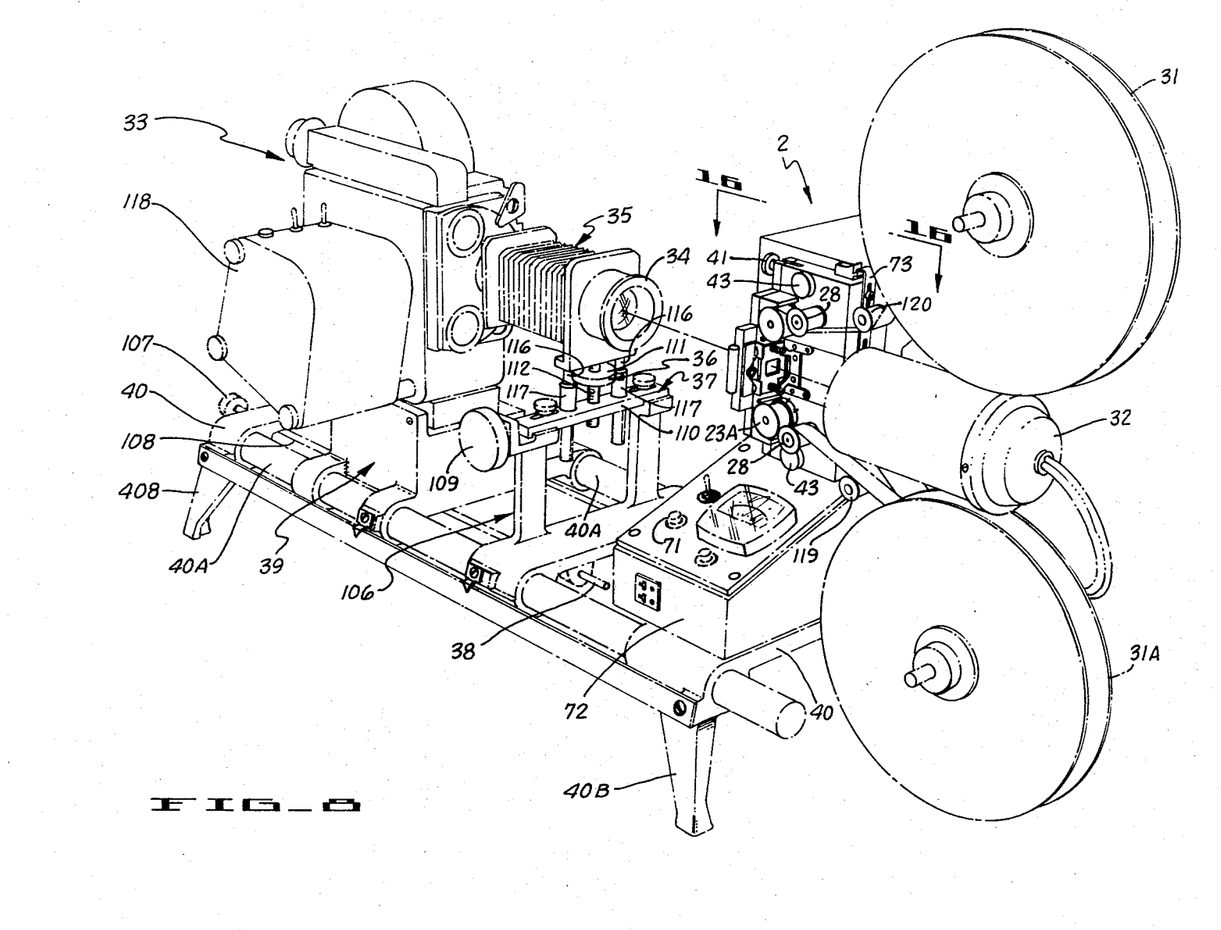
FIG. 9 is an enlarged perspective view of the printer head with the film guide in the operating position.

The printer will move the film one frame at a time each time a button 71 is pressed on the control panel 72. In order to cause the printer to move the film without printing and to hold registration pins 12A away from the film and prevent their registering function to slide lockout member 73 is slidably attached to the projector module by fasteners 74. The slide moves the distance provided in slots 76. In order to place the slide in the non-printing mode, button 77 is pivoted about pin 78 which moves shoulder 79 out of the way so that the slide can be moved downwardly. As the slide moves downwardly, the bottom edge 81 strikes the cam face 82 of a lockout member 56 slide 11 and causes the slide to move to the right as shown in FIGS. 9 and 10. Button 77 can then be released and a spring will return it to its original position and shoulder 79 will come to rest under end 73A of the slide. As long as the slide 11 is in this position, arm 10 will be moved to the left as shown in FIG. 17 and will activate microswitch 14 and keep the circuit closed thus causing step motor 1 to be activated until arm 10 is permitted to return to depression 9A in cam 9.

A spring 83 mounted on the projector module has an end 84 which is inserted through an opening 86, and biases slide 73 upwardly. Thus when button 77 is depressed, end 73A slides off shoulder 79 and the step motor stops when one complete revolution of cam 9 has been completed.

FILM GUIDE

A separate film guide member 26 is provided to maintain the film 29 in registration with the sprockets 23A and 23B. The guide member is mounted on slide bars 27 which are received in openings 86 in the projector module. In order to thread the film on the projector module it is merely necessary to turn threaded nut 41 so that the lower shoulder 41A will be frictionally released from the grooved portion 87 on member 26. The threaded member 88 can then be pivoted clear and member 26 pulled out on slide bars 27.

Referring to FIG. 10, it may be noted that the face 89 is indented along the longitudinal path of the film 29 so that only the edges of the film outside the image area will ride on longitudinal shoulders 91A and 91B of the member.

The member 26 is constructed so that the face 92 is positioned adjacent the inside edge of flanges 93A and 93B of sprockets 23A and 23B respectively.

As shown in FIG. 11, the sprocket wheels are formed with an annular shoulder 94A and 94B on which one edge of film 29 rides. Thus when member 26 is secured in place by nut 41 against groove 87, there is just sufficient clearance between annular shoulders 94A and 94B and shoulder 91 for the film to slide smoothly. On the other edge of the film, there is just sufficient clearance between the sprocket pins 42 and the shoulder 91B on member 26 for the film to pass.

In the vicinity of the aperture plate 20, the film is guided on one side by a flange 96 attached to the member 26 and on the other side by a divided flange 97A and 97B. These flanges are mounted on a plate 98 formed with a slotted opening 99 so that the flanges can move in the direction of double arrow 101 as shown in FIGS. 9 and 10. A spring 102 is connected to rivet 103 and biases the plate and flanges 97A and 97B against the side of aperture plate 20. The top ends 104A and 104B of the flanges are beveled to prevent striking the pressure plate 16. Spring 102 maintains the flanges in touching contact with the edge of the pressure plate 16.

BELLOWS MOUNT

Lens 43 and bellows 35 are supported on a movable carriage 106. The carriage slides longitudinally on rails 40A and movement is obtained by turning knob 107 which rotates threaded rod 108 which is inserted through a threaded opening in the carriage.

Horizontal motion is obtained by turning knob 109 which is connected to slide 110 by a threaded rod not shown.

Vertical movement of the lens is effected by turning knob 111 connected to slide 110 by threaded rod 112. Springs 113 bias slide 111 downwardly against the upper end of rod 112. The bellows mounting frame 114 is mounted on slide rods 116 which slide in sleeves 117.

CAMERA MOUNT

Camera 35 rides on camera carriage 39 which slides on rails 40A. A knob, not shown, connected to the frame 40 is attached to a threaded rod, not shown, which is connected to the camera carriage 39.

CAMERA MOTOR

An electric motor 118 is operably connected to camera 33. The motor is electrically connected to the projector module.

OPERATION OF THE OPTICAL PRINTER

In operation, new film is loaded into camera 33 and the lens is set at the proper distance from the film 29 in aperture opening 51. The lens is then moved vertically or horizontally to be in proper alignment with camera 33 and the aperture opening 51. The film 29 is placed on reel 31A, threaded over idler wheel 119, over idler wheel 28 and under sprocket wheel 23A, over pin 21, over pressure plate 16, over pin 21, around sprocket 23B, under idler 28 and under idler wheel 120 and onto reel 31.

Film guide 26 is then moved into engagement with projector module 2 and locked by nut 41.

To advance the film one frame, button 71 is pushed and immediately released. An electric circuit to the step motor 1 is energized which causes motor shaft 121 and cam 9 to rotate. Arm 10 is forced from its recess 9A and causes arm 14A to activate microswitch 14 and to energize a circuit to motor 1 until arm 10 once again reaches depression 9A. Gear 3 on shaft 121 rotates gears 4 and 5 which in turn rotate sprocket wheels 23A and 23B. The gear ratios are such that the sprocket wheels make one-eighth of a revolution which is sufficient to advance the film 29 one frame. A pulley wheel 122 on gear 5 moves spring member 123 which moves over idler wheels 124 and thence to reel 31. Cam 8, also attached to shaft 121, rotates and causes cam arm 125 to move off flat portion 8A and to activate microswitch 15 which sends a signal to camera motor 118 to take one picture. The circuit is set up so that after the camera has taken a picture and the camera film has been advanced, it sends back a signal to the projector to advance the film 29 one more frame.

When the film 29 is moving, pins 12 are withdrawn from the perforation in the film and tension pins 21 are moved against the film to keep the film in tight registration with the pins 42 on the sprocket wheels 23A and 23B. When the sprocket wheels stop, pins 21 move away from the film and permit some slack in the film between the sprockets. Pins 12 are then inserted through the perforations in the side of the film and complete any slight registration of the film with the aperture opening 51 that is required.

I claim:

1. An optical printer for printing from a length of film having individual picture frames thereon and formed with a plurality of registration openings formed longitudinally along one edge comprising:
  a. a projection module member;
  b. a first sprocket mounted for rotation on said module member having circumferential pins for registration with said registration openings;
  c. a second sprocket mounted for rotation on said module member having circumferential pins for registration with said registration openings and being laterally spaced from said first sprocket;
  d. a step motor operably connected to said first and second sprockets for conjoint intermittent rotation of said sprockets;
  e. a pair of laterally spaced registration pins operably connected to said motor and mounted between said sprockets on said projection module and mounted for intermittent movement into and out of the registration openings in said film, said pins being inserted through said openings when said film is motionless and retracted therefrom when said film is being moved by said sprockets; and
  f. first and second tension pins mounted on said projection module operably connected to said motor and mounted respectively between said registration pins and said sprockets and mounted for movement against said film to tension said film when it is moving and for movement out of tensioning contact with said film when said film is at rest to permit some movement of said film by said registration pins when they are inserted into said registration openings.

2. An optical printer as described in claim 1 comprising:
  a. an aperture plate mounted on said projection module having an opening therein permitting optical projection of an image on said film, a pair of openings for receiving the ends of said registration pins, and said plate being positioned on the opposite side of said film from said tension pins.

3. An optical printer as described in claim 1 comprising:
  a. first and second sprocket shafts rotatably mounted on said projection module and carrying said sprockets, said shafts protruding from said module;
  b. a motor module; and
  c. means for releasably connecting said motor in said motor module with said sprocket shafts.

4. An optical printer as described in claim 3 comprising:
  a. a take up reel mounted on said motor module for receiving the film from said first sprocket and being operatively connected to said motor for intermittent conjoint movement with said sprockets;
  b. a feed reel mounted on said motor module for supplying film to said second sprocket and being operatively connected to said motor for intermittent conjoint movement with said sprockets; and
  c. said motor having a reverse mode for driving said film forward or backward through said projection module.

5. An optical printer as described in claim 3 comprising:
  a. a slide member mounted for reciprocation on said projection module member;
  b. a pair of film tension brackets pivotally mounted on said module member carrying said tension pins and having lever arms;
  c. said slide member being operatively connected to said tension brackets for translating said longitudinal reciprocating movement to rotational movement of said tension brackets;

d. a registration pin bracket carrying said registration pins and mounted on said slide for movement therewith;

e. an arm member operably connected to said motor and mounted for pivotal movement on said motor module; and f. said slide being formed with an opening for releasably receiving said arm for reciprocation of said slide.

6. An optical printer as described in claim 3 comprising:

a. a motor shaft connected to said step motor;

b. a first cam mounted for rotation on said motor shaft and being circular in cross section and having a first cam surface formed on the circumference;

c. a first microswitch operatively connected to said motor by an electrical circuit for energizing said motor;

d. a first cam follower connected to said first microswitch and mounted for movement along the periphery of said first cam for keeping the motor energized for a selected period of time and said cam being positioned to move onto said first cam surface for de-energizing said circuit to said motor;

e. a second cam mounted for rotation on said motor shaft and being circular in cross section and having a first cam surface formed on the circumference;

f. a camera mounted for taking pictures of said frames on said film;

g. switch means operatively connected to said camera for triggering the camera shutter;

h. a second microswitch operatively connected to said switch means; and i. a second cam follower connected to said second microswitch and mounted for movement along the periphery of said second cam for energizing said second microswitch to cause the camera to take a picture.

7. An optical printer as described in claim 2 comprising:

a. a pressure plate mounted on said projection module for reciprocating movement having a first position in close registration with said aperture plate permitting movement of said film therebetween;

b. a second position away from said aperture plate; and c. spring means biasing said pressure plate to said first position.

8. An optical printer as described in claim 7 comprising:

a. a film guide mounted on a pair of slide bars;

b. said projector module being formed with openings registering and slidably receiving said slide bars;

c. said film guide being formed with a depressed face and adjacent shoulders for contact only with the sides of said film, said face and shoulders having curved portions at the ends in face to face registration with said sprockets for guiding and containing said film; and d. said guide having a first position in registration with said sprockets during movement of said film, and a second position away from said sprockets for easy loading of said film.

9. An optical printer as described in claim 5 comprising:

a. a lockout member having a cam face formed on said slide member;

b. a slide lockout member for engaging said cam face; and c. manually engageable means for holding said slide lockout member in and out of operation.

10. An optical printer as described in claim 6 comprising:

a. a lens mounting member mounted on said frame and having a forward, backward and transverse mechanism;

b. a lens mounted on said lens mounting member; and c. a bellows connecting said camera and said lens.

11. An optical printer as described in claim 1 comprising:

a. a counter device operably connected to said motor for counting the number of frames on said film as they are printed.

* * * * *